(12) United States Patent
Kim et al.

(10) Patent No.: US 8,531,441 B2
(45) Date of Patent: Sep. 10, 2013

(54) METHOD FOR DISPLAYING STEREO-SCOPIC IMAGE AND DISPLAY APPARATUS FOR PERFORMING THE SAME

(75) Inventors: Hwi Kim, Seoul (KR); Ji-Hyun Bae, Seoul (KR); Kyung-Ho Jung, Yongin-si (KR); Seung-Hoon Lee, Hwaseong-si (KR); Hee-Seop Kim, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 466 days.

(21) Appl. No.: 12/854,027

(22) Filed: Aug. 10, 2010

(65) Prior Publication Data
US 2011/0175857 A1 Jul. 21, 2011

(30) Foreign Application Priority Data
Jan. 21, 2010 (KR) ........................ 10-2010-0005487

(51) Int. Cl.
*G09G 5/00* (2006.01)
*G02B 27/22* (2006.01)
*G02B 27/10* (2006.01)
*G03B 21/60* (2006.01)

(52) U.S. Cl.
USPC ........... 345/204; 359/463; 359/455; 359/619; 349/96

(58) Field of Classification Search
USPC ............ 345/204; 359/463, 455, 619; 349/96
See application file for complete search history.

(56) References Cited

U.S. PATENT DOCUMENTS

| 2003/0016444 A1* | 1/2003 | Brown et al. ................. 359/462 |
| 2008/0165275 A1* | 7/2008 | Jones et al. ................... 348/446 |
| 2009/0309887 A1* | 12/2009 | Moller et al. ................. 345/522 |
| 2010/0177171 A1* | 7/2010 | Marcus et al. ................. 348/53 |

FOREIGN PATENT DOCUMENTS

| JP | 10-078563 | 3/1998 |
| JP | 2004-144874 | 5/2004 |
| JP | 2006-259191 | 9/2006 |
| JP | 2008-083073 | 4/2008 |
| KR | 10-2006-0022883 | 3/2006 |
| KR | 10-0580216 | 5/2006 |
| KR | 10-2006-0097175 | 9/2006 |
| KR | 10-2007-0102932 | 10/2007 |
| KR | 10-2008-0013304 | 2/2008 |
| KR | 10-0839429 | 6/2008 |
| KR | 10-0859694 | 9/2008 |
| KR | 10-2009-0041575 | 4/2009 |
| KR | 10-0893618 | 4/2009 |

* cited by examiner

*Primary Examiner* — Ariel Balaoing
(74) *Attorney, Agent, or Firm* — H.C. Park & Associates, PLC

(57) ABSTRACT

A method for displaying a stereoscopic image of a display apparatus, the display apparatus can divide a received frame image corresponding to the preset column areas to generate M sub-frame images. In this example, the display apparatus may include a plurality of lenticular lenses disposed over a display panel to divide the display panel into a plurality of column areas. Each of the lenticular lenses may include a lenticular plate converting a flat image displayed on each of the column area into K stereoscopic images having directions different from each other. The M sub-frame images may be displayed on the display panel in a time division method. M shutters disposed over the M lenticular lenses according to the sub-frame image displayed on the display panel may selectively be opened and closed. Herein, K and M are natural numbers.

20 Claims, 13 Drawing Sheets

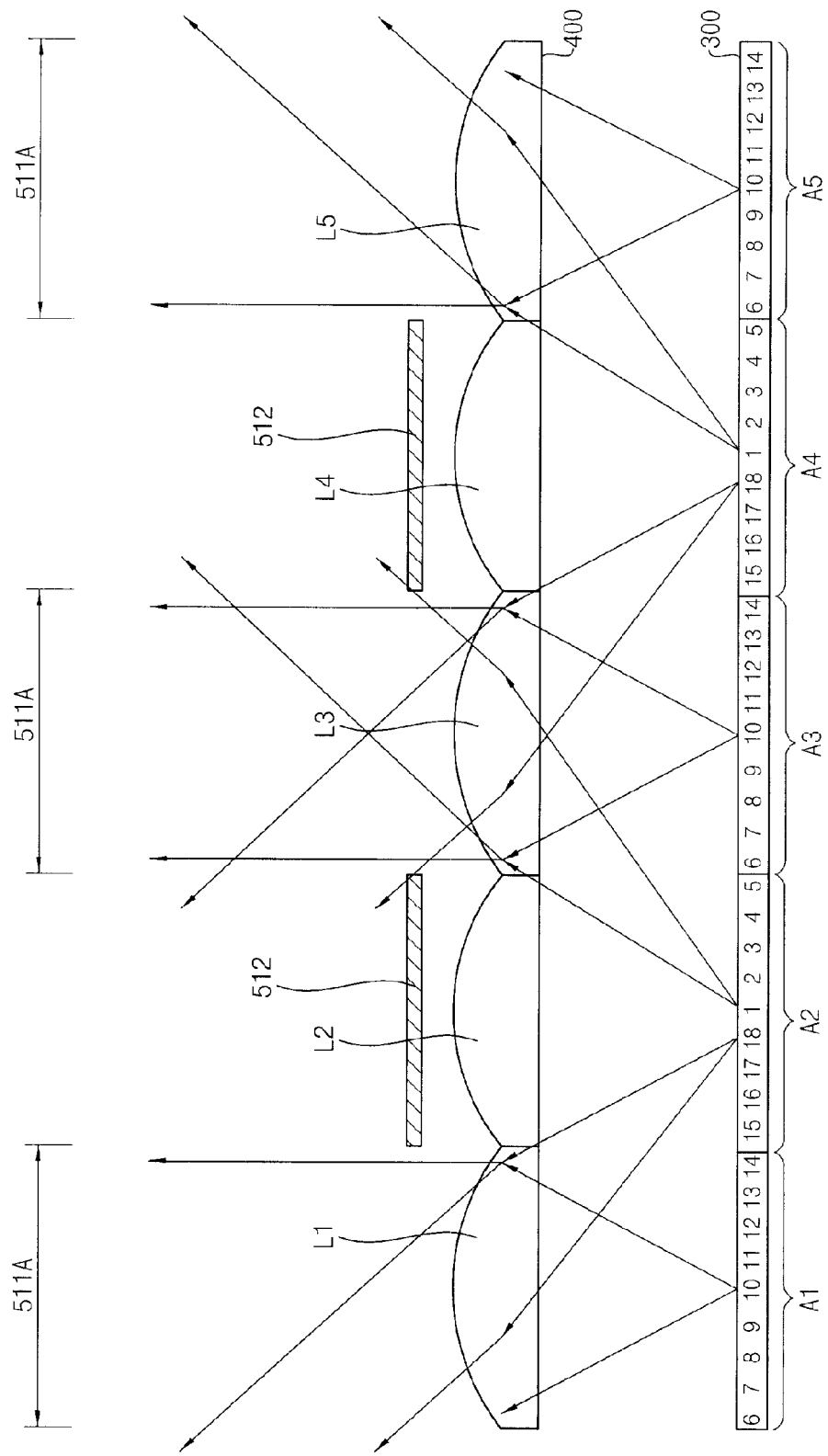

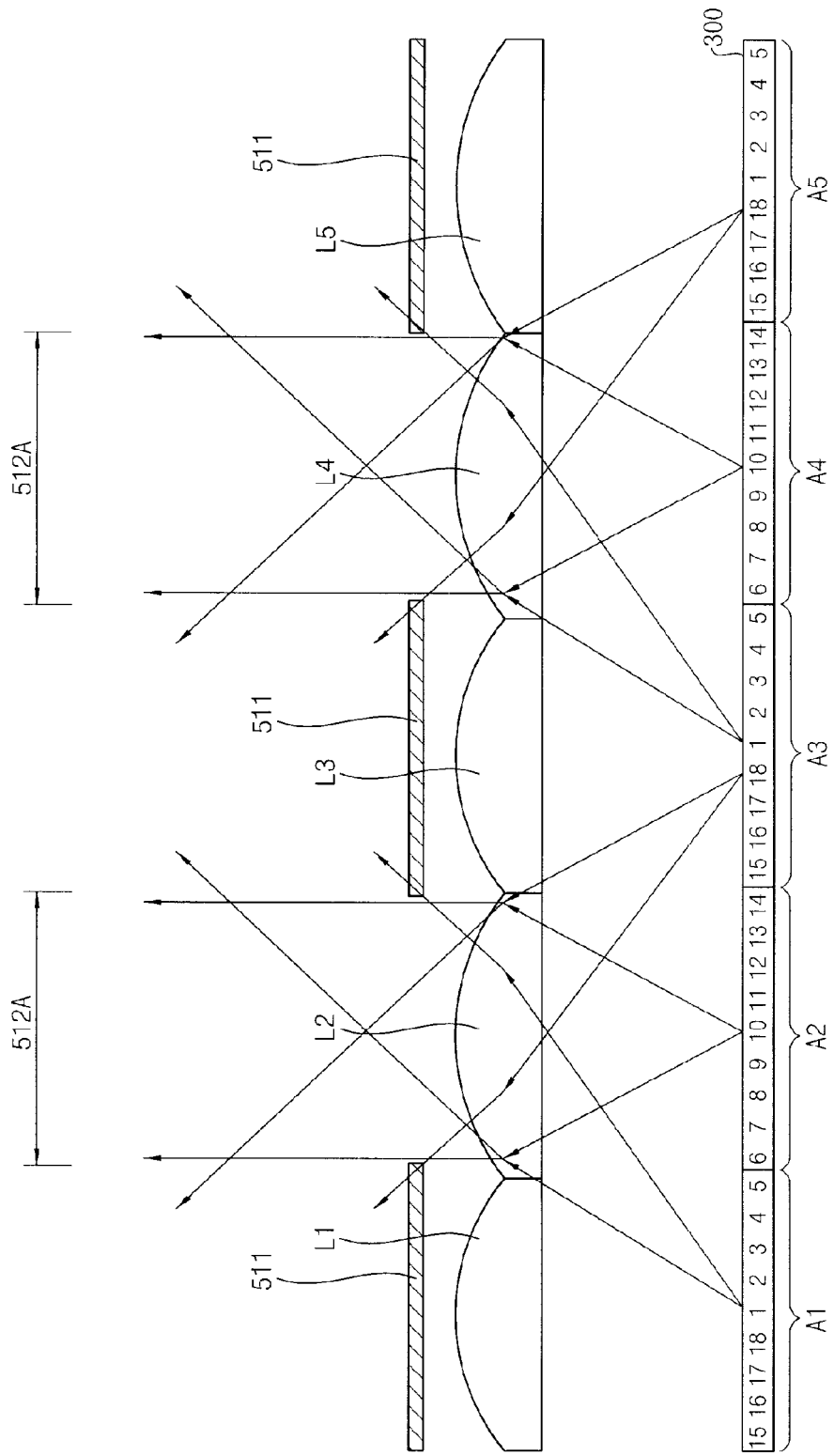

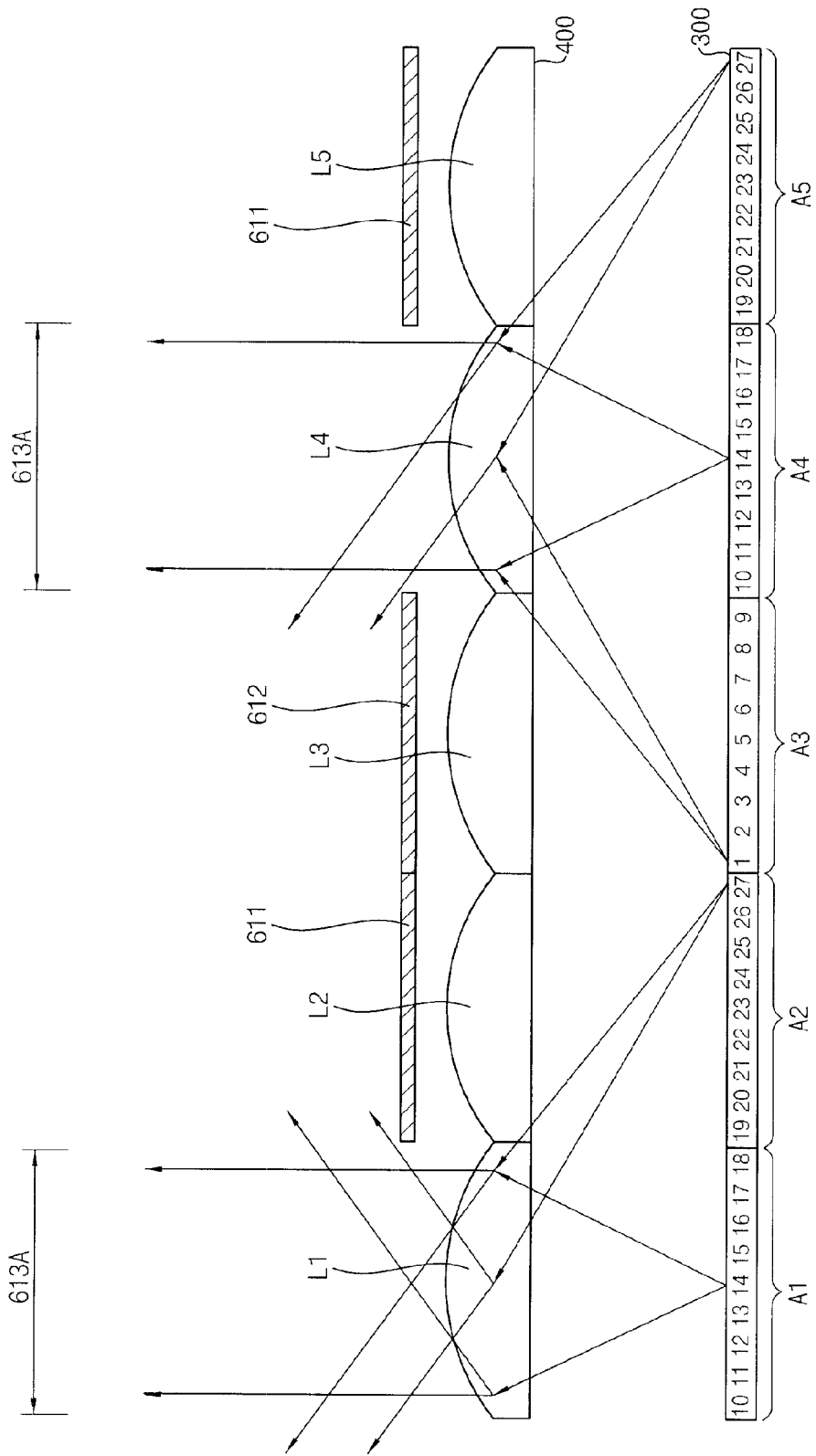

METHOD FOR DISPLAYING STEREO-SCOPIC IMAGE AND DISPLAY APPARATUS FOR PERFORMING THE SAME

CROSS-REFERENCE TO RELATED APPLICATION

This application claims priority to and benefit of Korean Patent Application No. 2010-5487, filed on Jan. 21, 2010, which is herein incorporated by reference for all purposes as if fully set forth herein.

BACKGROUND OF THE INVENTION

1. Field of the Invention

Exemplary embodiments of the present invention relate to a method and an apparatus for displaying a stereoscopic image, more particularly, relate to a method and an apparatus for displaying a stereoscopic image using a lenticular lens capable of enhancing display quality of a display apparatus.

2. Description of the Related Art

Generally, a display apparatus may display a two-dimensional (2D) flat image. Recently, there has been an increase in demand for a three-dimensional (3D) stereoscopic image utilized in games and movies; thus, a display apparatus capable of displaying the 3D stereoscopic images has been developed. For example, a pair of different 2D flat images can be provided to left and right eyes of a viewer, and then a viewer's brain can mix the pair of 2D flat images so that the viewer can perceive the 3D stereoscopic image.

Generally, a stereoscopic image display apparatus can display a stereoscopic image using a principle of binocular parallax through the viewer's two eyes. For example, since the left eye and the right eye of the viewer can be spaced apart from each other, two different images at two different angles can be inputted to the viewer's brain. The stereoscopic image display apparatus uses the binocular parallax of the viewer.

Method of using the binocular parallax may be classified into a stereoscopic type and an auto-stereoscopic type. The stereoscopic type may be classified into an anaglyph type using blue and red glasses with respect to two eyes, respectively, and a liquid crystal shutter glasses type in which each of a left image corresponding to the left eye and a right image corresponding to the right eye can periodically be displayed at an interval by utilizing opening and closing liquid crystal shutters with respect to the left eye and the right eye being synchronized with the interval.

The auto-stereoscopic may include a lenticular type in which a lenticular lens having a plurality of focusing points can be used. In the lenticular type, the lenticular lens can refract an incident 2D flat image at a plurality of focusing points to emit a plurality of stereoscopic images. In this way, the viewer can view stereoscopic images through the lenticular is lens.

SUMMARY OF THE INVENTION

Exemplary embodiments of the present invention provide an apparatus and a method for providing a stereoscopic image with an enhanced viewing angle.

Additional features of the invention will be set forth in the description which follows, and in part will be apparent from the description, or may be learned by practice of the invention.

Exemplary embodiments of the present invention provide a method for displaying a stereoscopic image of a display apparatus, the display apparatus comprising a lenticular plate comprising a plurality of lenticular lenses disposed over a display panel to divide the display panel into a plurality of column areas, and to convert a flat image displayed on each of the column areas into K stereoscopic images having directions different from each other. The method includes dividing column images corresponding to the column areas to generate M sub-frame images. The method also includes displaying the M sub-frame images on the display panel in a time division method. The method includes selectively opening and closing M shutters disposed over M lenticular lenses according to the sub-frame image displayed on the display panel. The K and M are natural numbers.

Exemplary embodiments of the present invention provide a display. The display includes a display panel comprising a plurality of color pixels. The display also includes a lenticular plate including a plurality of lenticular lenses to divide the display panel into a plurality of column areas, each of the lenticular lenses to convert a flat image displayed on each of the column areas into K stereoscopic images having directions different from each other. The is display also includes a control part to separate column images corresponding to the column areas to generate M sub-frame images and to display the M sub-frame images on the display panel in a time division method. The display further includes a barrier plate comprising M shutters disposed over the M lenticular lenses, the M shutters being selectively opened and closed according to the sub-frame image being displayed on the display panel. The K and M are natural numbers.

Exemplary embodiments of the present invention provide an apparatus. The apparatus includes a plurality of vertical and horizontal display pixels disposed on a panel and a sheet of cylindrical lenses disposed on the display pixels to provide stereoscopic images by dividing the vertical display pixels. Each direction of the stereoscopic images is different from each other. The images of the vertical display pixel are converted into sub-frame images using a time division method. The apparatus includes a plate including a plurality of shutters disposed over the cylindrical lenses. The shutters selectively open and close in response to displaying of the sub-frame images.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 4A and FIG. 4B are diagrams illustrating a motion of the stereoscopic image display apparatus of FIG. 1.

FIG. 9A, FIG. 9B and FIG. 9C are diagrams explaining a motion of the stereoscopic image display apparatus of FIG. 6.

DETAILED DESCRIPTION OF THE ILLUSTRATED EMBODIMENTS

Figure 1:
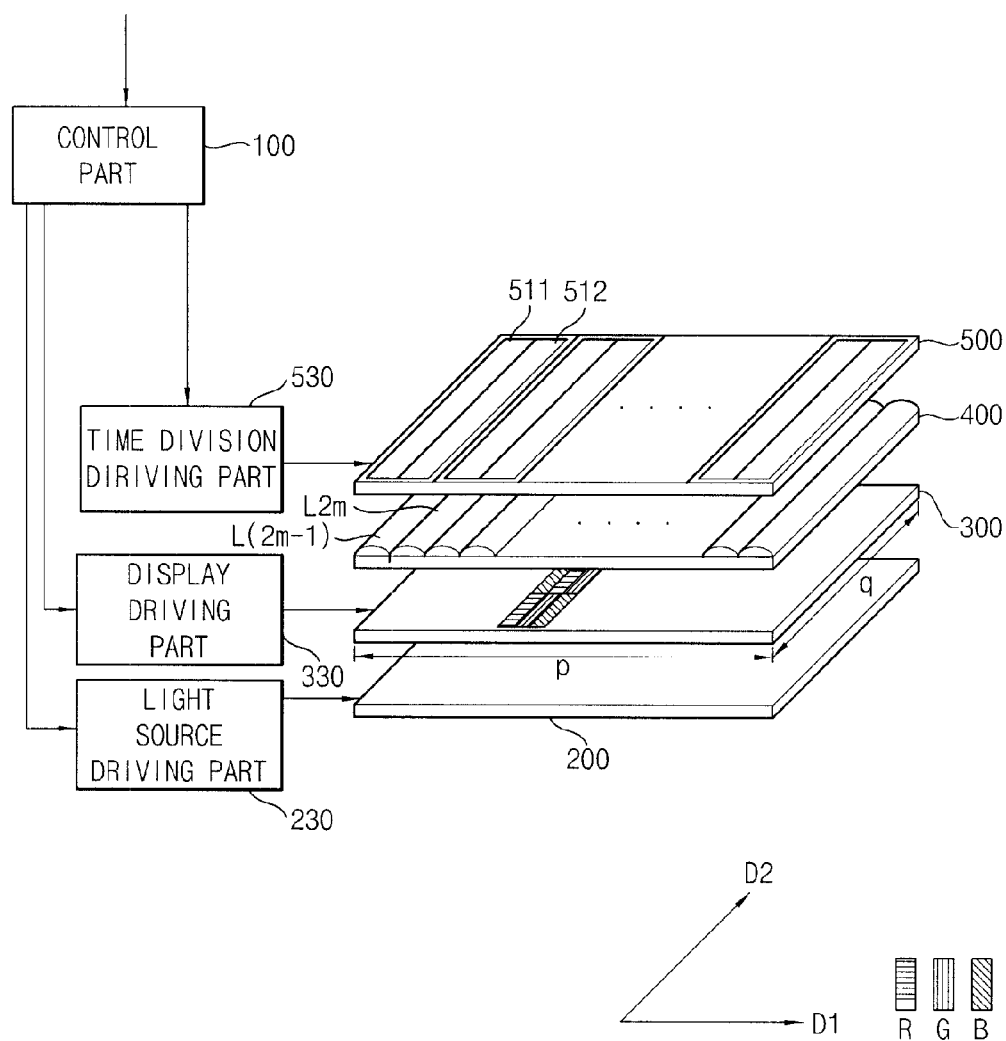
FIG. 1 is a block diagram illustrating a stereoscopic image display apparatus according to exemplary embodiments of the present invention.

The present invention is described more fully hereinafter with reference to the is accompanying drawings, in which exemplary embodiments of the present invention are shown. The present invention may, however, be embodied in many different forms and should not be construed as limited to the example embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It is understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any part, combinations of two or more parts, or combinations of all parts of the associated listed items.

It is understood that although the terms using a numerical term such as a first, a second, a third they may be used herein to describe various elements, components, regions, layers and/or sections, these elements, components, regions, layers and/or sections should not be limited by these numerical terms. These terms are merely used to distinguish one element, component, region, layer or section from another region, layer or section. Thus, an element, a component, a region, a layer or a section designated as "first" could be interpreted as an element, a component, a region, a layer or a section designated as a "second" without departing from the teachings of the present invention.

It is also noted that terms related to spatially relative terms, such as "beneath," is "below," "lower," "above," "upper" and these terms may be used herein to describe one element or feature's relationship to another element(s) or feature(s) as illustrated in the figures. It is understood that the spatially relative terms are intended to show different orientations of the apparatus based on an operation of an element in addition to the orientation of the element depicted in the figures. For example, if the apparatus in the figures is turned over, elements described as "below" or "beneath" other elements or features would then be oriented "above" with respect to the other elements or features. Thus, the term using "below" can be interpreted to encompass both an orientation of above and below. The elements of the apparatus may be otherwise oriented (e.g., rotated 90 degrees or at certain orientations) and the spatially relative descriptors used herein can be interpreted accordingly.

The terminology used herein is for the purpose of describing exemplary embodiments may not be intended to be limiting of the present invention. As used herein, the singular forms "a," "an" and "the" may be intended to include the plural forms as well unless the context clearly indicates otherwise. It is further understood that the terms "comprises" and/or "comprising," when used in this specification may specify the presence of stated features, integers, steps, operations, elements, and/or components, but may not preclude the presence or addition of one or more other features, integers, steps, operations, elements, components, and/or groups thereof.

Exemplary embodiments of the invention are described herein with reference to cross-sectional illustrations that are schematic illustrations of idealized example embodiments (and intermediate structures) of the present invention. As such, various exemplary embodiments are illustrated by way of examples, and not by way of limitation, thus, variations from the shapes of the illustrations as a result, for example, of manufacturing techniques and/or tolerances, are to is be expected. Thus, illustrated exemplary embodiments of the present invention should not be construed as limited to the particular shapes of regions illustrated herein but are to be construed including deviations in shapes that result, for example, from manufacturing techniques and option by way of configurations. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of an apparatus and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meanings in the context of the relevant art and will not be interpreted in an idealized or overly formal sense unless expressly so defined herein.

Hereinafter, the present invention will be explained in detail with reference to the accompanying drawings.

Figure 2:
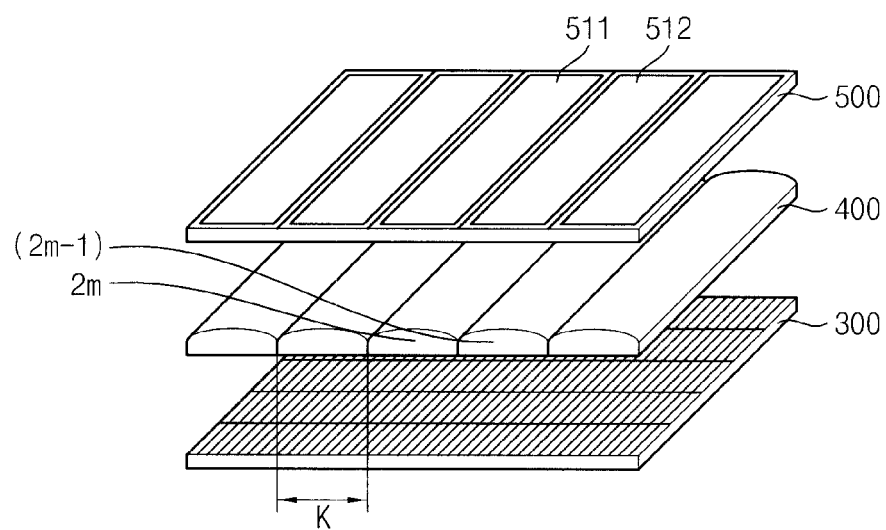
FIG. 2 is a perspective view illustrating the stereoscopic image display apparatus of FIG. 1.

FIG. 1 is a block diagram illustrating a stereoscopic image display apparatus according to exemplary embodiments of the present invention. FIG. 2 is a perspective view illustrating the stereoscopic image display apparatus of FIG. 1.

Referring to FIG. 1, the stereoscopic image display apparatus may include a control part 100, a light source part 200, a light source driving part 230, a display panel 300, a is display driving part 330, a lenticular plate 400, a barrier plate 500 and a time division driving part 530.

The control part 100 can control a driving of the stereoscopic image display apparatus. The control part 100 can generate a first sub-frame image and a second sub-frame image based on an image received from outside. The control part 100 may provide the display driving part 330 with the first sub-frame image and the second sub-frame image in a time division type.

The light source part 200 may include a light source generating light. The light source part 200 may be disposed on a rear surface of the display panel 300 and may provide the display panel 300 with the light. The light source may be a direct-illumination type disposed on the rear surface of the display panel 300 or an edge-illumination type disposed at an edge of the display panel 300. The light source may include a lamp or a light-emitting diode (LED).

The light source driving part 230 can generate a driving signal driving the light source part 200 according to a control of the control part 100.

The display panel 300 may include a red pixel R, a green pixel G and a blue pixel B, and has a resolution of p×q. Each of the color pixels R, G and B may have a short side extended along a first direction D1 and a long side extended along a second direction D2 crossing the first direction D1. The color pixels adjacent to each other along the second direction D2 may be disposed in a mosaic shape having different colors from each other. The display panel 300 can display the first sub-frame image and the second sub-frame image in the time division type according to a control of the display driving part 330. Herein, p and q are natural numbers.

The display driving part 330 can drive the display panel 300 according to the is control of the control part 100 and may include a gate driving part and a data driving part.

The lenticular plate 400 may include a plurality of lenticular lenses L(2m−1) and L2m. The lenticular lenses L(2m−1) and L2m may be arranged substantially parallel with the first direction D1, and each of the lenticular lenses L(2m−1) and L2m may be extended in the second direction D2. Each of the lenticular lenses L(2m−1) and L2m may be disposed over K color pixels arranged substantially parallel with the first direction D1 and may convert K flat images displayed on the K color pixels into K stereoscopic images having directions different from each other. The first sub-frame image may include odd-numbered column images respectively corresponding to odd-numbered lenticular lenses L(2m−1) and may be displayed on the display panel 300. The second sub-frame image may include even-numbered column images respectively corresponding to even-numbered lenticular lenses L2m and may be displayed on the display panel 300. Herein, m and K are natural numbers.

The barrier plate 500 may include a first shutter 511 and a second shutter 512. The first shutter 511 may be disposed over the odd-numbered lenticular lenses L(2m−1). The second shutter 512 may be disposed over the even-numbered lenticular lenses L2m.

The time division driving part 530 can open the first shutter 511 and close the second shutter 512 according to the control of the control part 100 in response to the odd-numbered column images respectively corresponding to the odd-numbered lenticular lenses L(2m−1) being displayed on the display panel 300. The time division driving part 530 can close the first shutter 511 and open the second shutter 512 in response to the even-numbered column images respectively corresponding to the even-numbered lenticular lenses L2m being displayed on the display panel 300.

Figure 3A:
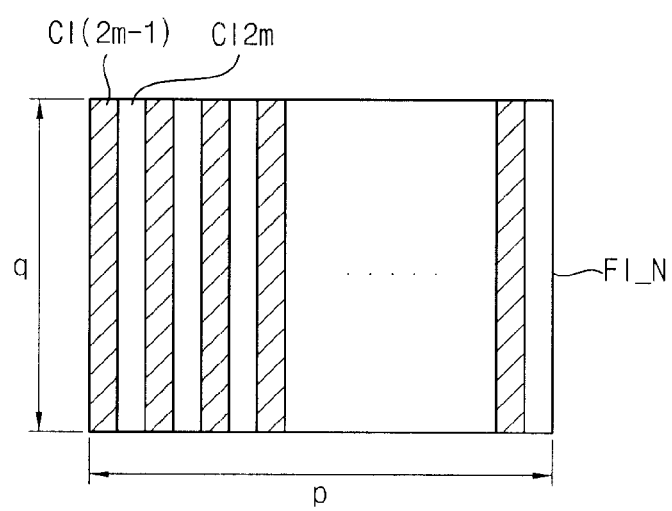
FIG. 3A, FIG. 3B and FIG. 3C are diagrams explaining a method for processing image of a control part of FIG. 1.
Figure 3B:
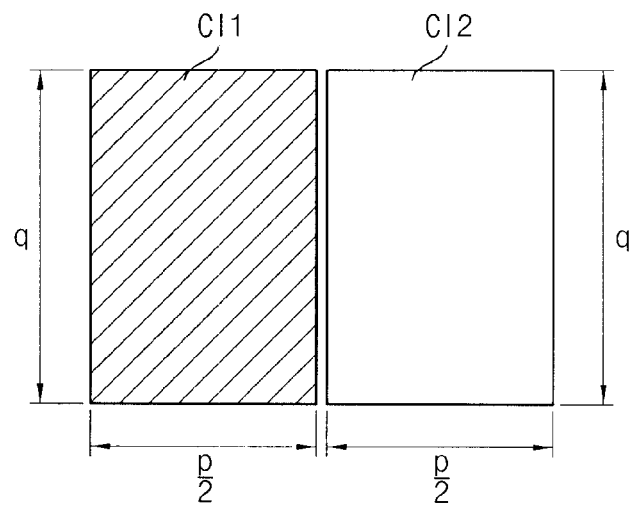
Figure 3C:
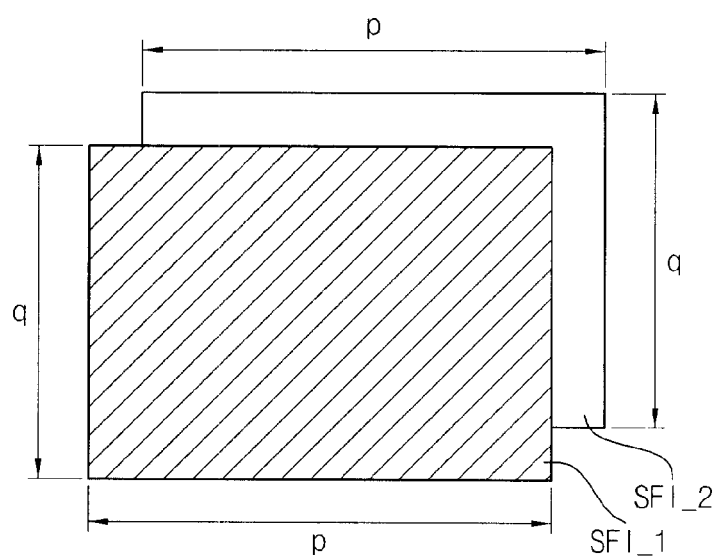

FIG. 3A, FIG. 3B and FIG. 3C are diagrams explaining a method for processing is image according to a control part of FIG. 1.

Referring to FIG. 1 and FIG. 3A, the control part 100 can receive an N-th frame image FI_N having a resolution of p×q. The frame image FI_N may include the odd-numbered column images CI(2m−1) respectively corresponding to the odd-numbered lenticular lenses L(2m−1) and the even-numbered column images CI2m respectively corresponding to the even-numbered lenticular lenses L2m. Herein, N is a natural number.

Referring to FIG. 1 and FIG. 3B, the control part 100 may divide the frame image FI_N into a first column image CI1 including the odd-numbered column images CI(2m−1) and a second column image CI2 including the even-numbered column images CI2m. Each resolution of the first column image CI1 and the second column image CI2 is p/2×q.

Referring to FIG. 1 and FIG. 3C, the control part 100 may scale up resolutions of the first column image CI1 and the second column image CI2 to the resolution of the display panel 300 to generate a first sub-frame image SFL_1 and a second sub-frame image SFI_2, respectively.

The control part 100 may provide the display driving part 330 with the first sub-frame images SFL_1 and the second sub-frame image SFI_2, and the display driving part 330 can display the first sub-frame image SFL_1 on the display panel 300 during a first sub-frame interval and the second sub-frame image SFI_2 on the display panel 300 during a second sub-frame interval. For example, if a frame frequency of the N-th frame image FI_N received in the control part 100 is about 60 Hz, each frame frequency of the first sub-frame image SFL_1 and the second sub-frame image SFI_2 is about 120 Hz (=60 Hz×2).

Figure 5:
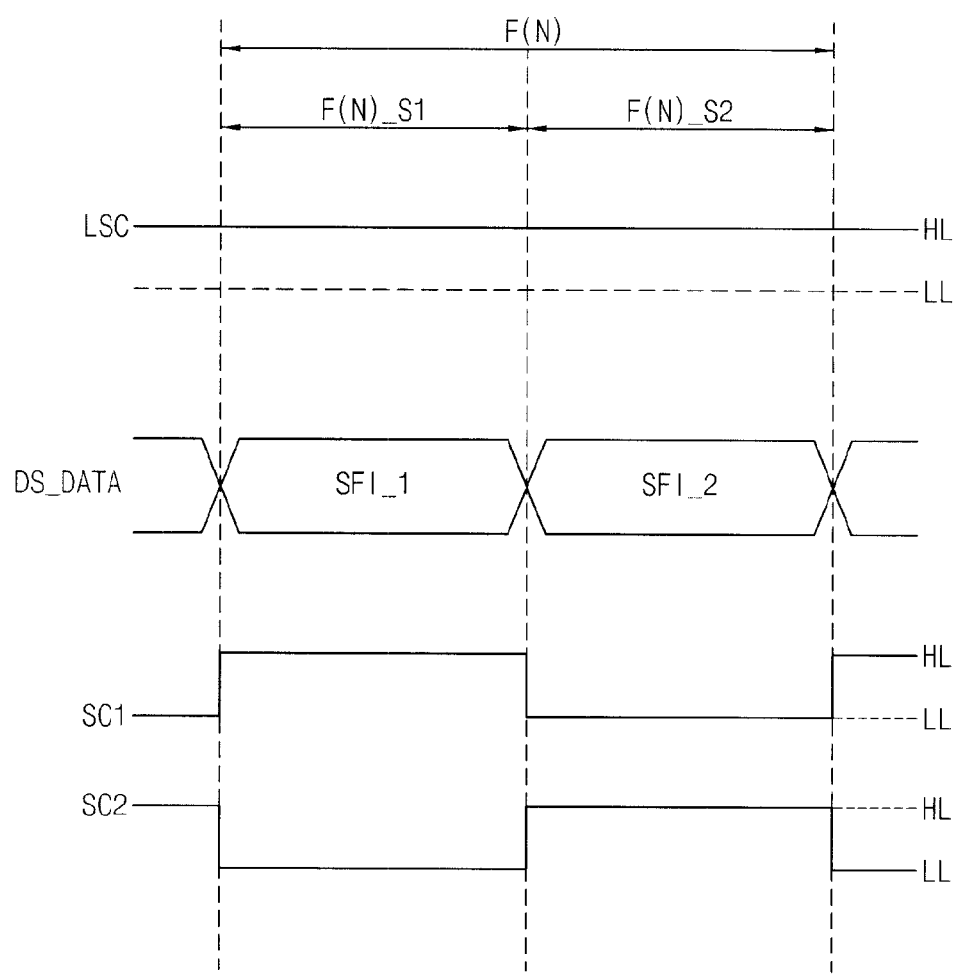
FIG. 5 is a driving timing chart of the stereoscopic image display apparatus of FIG. 1.

FIG. 4A and FIG. 4B are diagrams explaining a motion of the stereoscopic image display apparatus of FIG. 1. FIG. 5 is a driving timing chart of the stereoscopic image display is apparatus of FIG. 1.

Referring to FIG. 1, FIG. 4A and FIG. 5, the light source driving part 230 may provide the light source part 200 with a high level HL light source control signal LSC according to the control of the control part 100. The light source part 200 can be driven to provide the display panel 300 with the light.

The display driving part 330 may display the first sub-frame image SFL_1 corresponding to the odd-numbered lenticular lenses L(2m−1) on the display panel 300 during a first sub-frame interval F(N)_S1 of an N-th frame F(N) (DS_DATA) according to the control of the control part 100. Herein, N is a natural number.

The lenticular plate 400 may include a first lenticular lens L1, a second lenticular lens L2, a third lenticular lens L3, a fourth lenticular lens L4 and a fifth lenticular lens L5. The first lenticular lens L1 may be disposed over a first column area A1 including nine color pixels of the display panel 300. The second lenticular lens L2 may be disposed over a second column area A2 adjacent to the first column area A1 of the display panel 300. The third lenticular lens L3 may be disposed over a third column area A3 adjacent to the second column area A2 of the display panel 300. The fourth lenticular lens L4 may be disposed over a fourth column area A4 adjacent to the third column area A3 of the display panel 300. The fifth lenticular lens L5 may be disposed over a fifth column area A5 adjacent to the fourth column area A4.

For example, the first lenticular lens L1 may be disposed over the first column area A1 including nine color pixels 6, 7, 8, 9, 10, 11, 12, 13 and 14 of the display panel 300, and the second lenticular lens L2 may be disposed over the second column area A2 including nine color pixels 15, 16, 17, 18, 1, 2, 3, 4 and 5 of the display panel 300.

The time division driving part 530 can open and close the first shutter 511 and the is second shutter 512 of the barrier plate 500 according to the control of the control part 100. During the first sub-frame interval F(N)_S1 in which the odd-numbered column images of the first sub-frame image SFL_1 are displayed on the display panel 300, the time division driving part 530 may provide the barrier plate 500 with a first high level HL shutter control signal SC1 and a second low level LL shutter control signal SC2. The first high level HL shutter control signal SC1 can open the first shutter 511 disposed over the odd-numbered lenticular lenses L1, L3 and L5. The second low level LL shutter control signal SC2 can close the second shutter 512 disposed over the even-numbered lenticular lenses L2 and L4.

The third lenticular lens L3 may convert nine flat images displayed on the third column area A3 of the display panel 300 into nine stereoscopic images, and the nine stereoscopic images may be emitted through a first space 511A which is an opening of the first shutter 511. For example, the third lenticular lens L3 may convert average 4.5 flat images of nine flat images displayed on the second column area A2 or the fourth column area A3 adjacent to the third column area A3 into 4.5 stereoscopic images, and the 4.5 stereoscopic images may be emitted through the first space 511A. Thus, 18 stereoscopic images may be emitted through the first space 511A.

For example, with respect to nine flat images displayed on nine color pixels 15, 16, 17, 18, 1, 2, 3, 4 and 5 included in the second column area A2 corresponding to the second lenticular lens L2, since the second shutter 512 disposed over the second lenticular lens L2 is closed, the third lenticular lens L3 may convert the five flat images displayed on the five color pixels 1, 2, 3, 4 and 5 adjacent to the third lenticular lens L3 into five stereoscopic images having directions different from each other and five stereoscopic images are emitted through the first space 511A. For example, the first lenticular lens L1 may convert the four flat images displayed is on the four color pixels 15, 16, 17 and 18 of the second column area A2 adjacent to the first lenticular lens L1 into four stereoscopic images and the four stereoscopic images may be emitted through the first space 511A over the first lenticular lens L1.

In some examples, with respect to nine flat images displayed on nine color pixels 15, 16, 17, 18, 1, 2, 3, 4 and 5 included in the fourth column area A4 corresponding to the fourth lenticular lens L4, since the second shutter 512 disposed over the fourth lenticular lens L4 is closed, the third lenticular lens L3 may convert the four flat images displayed on the four color pixels 15, 16, 17 and 18 adjacent to the third lenticular lens L3 into four stereoscopic images having directions different from each other and four stereoscopic images may be emitted through the first space 511A. For example, the fifth lenticular lens L5 may convert the five flat images displayed on the five color pixels 1, 2, 3, 4 and 5 of the fourth column area A4 adjacent to the fifth lenticular lens L5 into five stereoscopic images and the five stereoscopic images may be emitted through the first space 511A on the fifth lenticular lens L5.

Thus, a viewer can perceive stereoscopic images having 18 directional characteristics emitted through the first space 511A during the first sub-frame interval F(N)_S1.

Referring to FIG. 1, FIG. 4B and FIG. 5, the light source driving part 230 may provide the light source part 200 with a high level HL light source control signal LSC according to the control of the control part 100. The light source part 200 can be driven to provide the display panel 300 with the light.

The display driving part 330 can display a second sub-frame image SFI_2 corresponding to the even-numbered lenticular lenses L2m on the display panel 300 during a second sub-frame interval F(N)_S2 consecutive to the first sub-frame interval F(N)_S1 (DS_DATA) according to the control of the control part 100.

The lenticular plate 400 may include a first lenticular lens L1, a second lenticular lens L2, a third lenticular lens L3, a fourth lenticular lens L4 and a fifth lenticular lens L5. The first lenticular lens L1 may be disposed over a first column area A1 including nine color pixels of the display panel 300. The second lenticular lens L2 may be disposed over a second column area A2 adjacent to the first column area A1 of the display panel 300. The third lenticular lens L3 may be disposed over a third column area A3 adjacent to the second column area A2 of the display panel 300. The fourth lenticular lens L4 may be disposed over a fourth column area A4 adjacent to the third column area A3 of the display panel 300. The fifth lenticular lens L5 may be disposed over a fifth column area A5 adjacent to the fourth column area A4.

For example, the first lenticular lens L1 may be disposed over the first column area A1 including nine color pixels 15, 16, 17, 18, 1, 2, 3, 4 and 5 of the display panel 300, and the second lenticular lens L2 may be disposed over the second column area A2 including nine color pixels 6, 7, 8, 9, 10, 11, 12, 13 and 14 of the display panel 300.

The time division driving part 530 can open and close the first shutter 511 and the second shutter 512 of the barrier plate 500 according to the control of the control part 100. During the second sub-frame interval F(N)_S2 in which the second sub-frame image SFI_2 is displayed on the display panel 300, the time division driving part 530 may provide the barrier plate 500 with a second high level HL shutter control signal SC2 and a first low level LL shutter control signal SC1. The second high level HL shutter control signal SC2 may open the second shutter 512 disposed over the even-numbered lenticular lenses L2 and L4. The first low level LL shutter control signal SC1 may close the first shutter 511 disposed over the odd-numbered lenticular lenses L1, L3 and L5.

The second lenticular lens L2 may convert nine flat images displayed on the is second column area A2 of the display panel 300 into nine stereoscopic images, and the nine stereoscopic images may be emitted through a second space 512A which is an opening of the second shutter 512. For example, the second lenticular lens L2 may convert average 4.5 flat images of nine flat images displayed on the first column area A1 or the third column area A3 adjacent to the second column area A2 into 4.5 stereoscopic images, and the 4.5 stereoscopic images may be emitted through the second space 512A. Thus, 18 stereoscopic images may be emitted through the second space 512A.

For example, with respect to nine flat images displayed on nine color pixels 15, 16, 17, 18, 1, 2, 3, 4 and 5 included in the first column area A1 corresponding to the first lenticular lens L1, since the first shutter 511 disposed over the first lenticular lens L1 is closed, the second lenticular lens L2 may convert the five flat images displayed on the five color pixels 1, 2, 3, 4 and 5 adjacent to the second lenticular lens L2 into five stereoscopic images having directions different from each other and five stereoscopic images are emitted through the second space 512A. For example, an adjacent even-numbered lenticular lens (not shown) may convert the four flat images displayed on the four color pixels 15, 16, 17 and 18 of the first column area A1 into four stereoscopic images and the four stereoscopic images may be emitted through a second space 512A over the adjacent even-numbered lenticular lens (not shown).

In some examples, with respect to nine flat images displayed on nine color pixels 15, 16, 17, 18, 1, 2, 3, 4 and 5 included in the third column area A3 corresponding to the third lenticular lens L3, since the first shutter 511 disposed over the third lenticular lens L3 is closed, the second lenticular lens L2 may convert the four flat images displayed on the four color pixels 15, 16, 17 and 18 adjacent to the second lenticular lens L2 into four stereoscopic images having directions different from each other, and the four stereoscopic images may be emitted through is the second space 512A. For example, the fourth lenticular lens L4 may convert the five flat images displayed on the five color pixels 1, 2, 3, 4 and 5 of the third column area A3 adjacent to the fourth lenticular lens L4 into five stereoscopic images and the five stereoscopic images may be emitted through the second space 512A over the fourth lenticular lens L4.

Thus, a viewer can perceive stereoscopic images having 18 directional characteristics emitted through the second space 512A during the second sub-frame interval F(N)_S2.

As a result, the viewer can perceive an N-th frame image FI_N as 18 stereoscopic images during one frame (e.g. about 60 Hz). Herein, N is a natural number.

Hereinafter, the same reference numerals may be used to refer to the same or like parts as those described in the present example embodiment and thus any repetitive explanation concerning the above elements may be omitted or briefly described to avoid unnecessarily obscuring the present invention.

Figure 6:
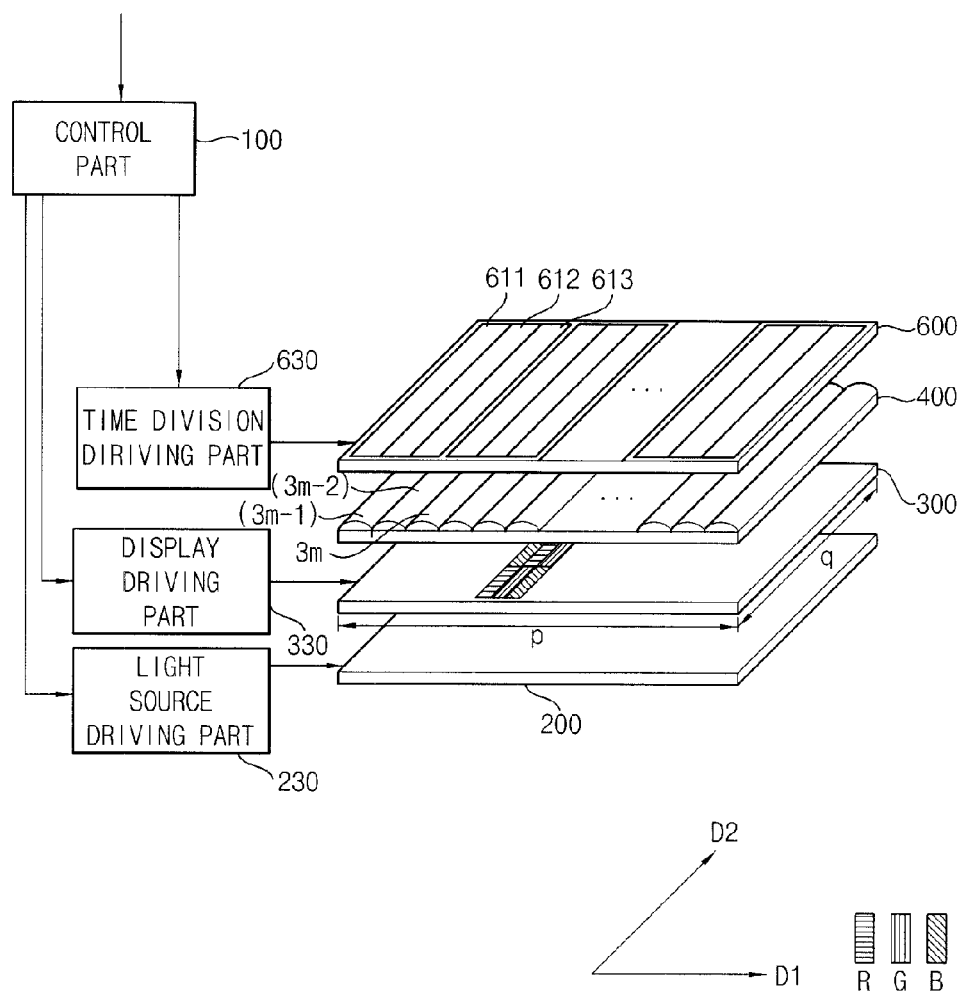
FIG. 6 is a block diagram illustrating a stereoscopic image display apparatus according to exemplary embodiments of the present invention.
Figure 7:
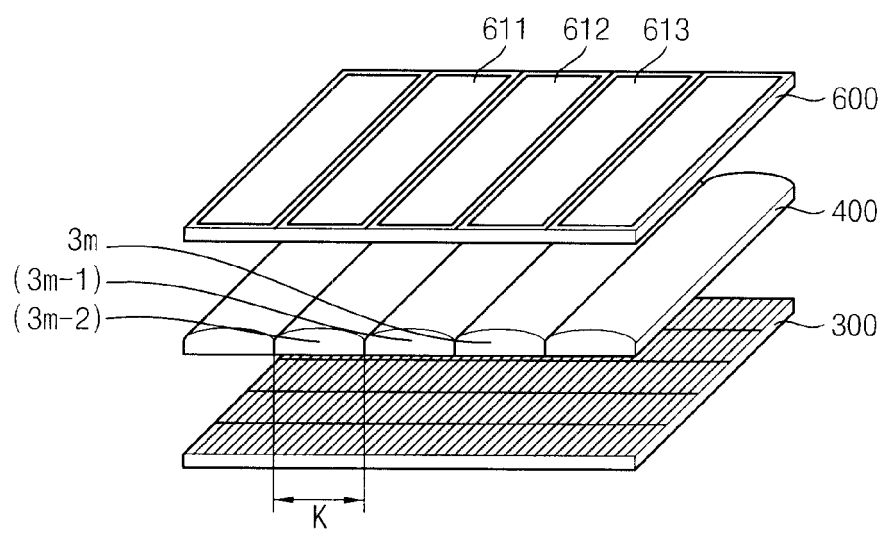
FIG. 7 is a perspective view illustrating the stereoscopic image display apparatus of FIG. 6.

FIG. 6 is a block diagram illustrating a stereoscopic image display apparatus according to exemplary embodiments of the present invention. FIG. 7 is a perspective view illustrating the stereoscopic image display apparatus of FIG. 6.

Referring to FIG. 6 and FIG. 7, the stereoscopic image display apparatus may include a control part 130, a light source part 200, a light source driving part 230, a display panel 300, a display driving part 330, a lenticular plate 400, a barrier plate 600 and a time division driving part 630.

The control part 130 based on an image received from an external apparatus can generate a first sub-frame image, a second sub-frame image and a third sub-frame image. The control part 130 may provide the display driving part 330 with the first sub-frame image, the is second sub-frame image and the third sub-frame image in the time division method.

The light source part 200 may include a light source generating the light, and may be disposed on a rear surface of the display panel 300 and may provide the display panel 300 with the light.

The light source driving part 230 can generate a driving signal driving the light source part 200 according to the control of the control part 130.

The display panel 300 may include a red pixel R, a green pixel G and a blue pixel B and has a resolution of p×q. Each of the color pixels R, G and B may have a short side color pixel extended along a first direction D1 and a long side color pixel extended along a second direction D2 crossing the first direction D1. The display panel 300 may display the first sub-frame image, the second sub-frame image and the third sub-frame image in the time division method according to the control of the display driving part 330. Herein, p and q are natural numbers.

The display driving part 330 can drive the display panel 300 according to the control of the control part 130, and may include a gate driving part and a data driving part.

The lenticular plate 400 may include a plurality of lenticular lenses L(3m−2), L(3m−1) and L3m. The lenticular lenses L(3m−2), L(3m−1) and L3m may be arranged substantially parallel with the first direction D1, and each of the lenticular lenses may be extended in the second direction D2. Each of the lenticular lenses L(3m−2), L(3m−1) and L3m may be disposed over K color pixels arranged substantially parallel with the first direction D1 and may convert K flat images displayed on the K color pixels into K stereoscopic images having directions different from each other. The first sub-frame image may include (3m−2)-th column images corresponding to (3m−2)-th lenticular lenses L(3m−2) and may be displayed on is the display panel 300. The second sub-frame image may include (3m−1)-th column images corresponding to the (3m−1)-th lenticular lenses L(3m−1) and may be displayed on the display panel 300. The third sub-frame image may include 3m-th column images corresponding to the 3m-th lenticular lenses L3m and may be displayed on the display panel 300. Herein, m and K are natural numbers.

The barrier plate 600 may include a first shutter 611, a second shutter 612 and a third shutter 613. The first shutter 611 may be disposed over the (3m−2)-th lenticular lenses L(3m−2), the second shutter 612 may be disposed over the (3m−1)-th lenticular lenses L(3m−1) and the third shutter 613 may be disposed over the 3m th lenticular lenses L3m.

The time division driving part 630 can open the first shutter 611 and can close the second shutter 612 and the third shutter 613 according to the control of the control part 130 in response to the (3m−2)-th column images corresponding to the (3m−2)-th lenticular lenses L3m−2 are displayed on the display panel 300. For example, the time division driving part 530 can open the second shutter 612 and can close the first shutter 611 and the third shutter 613 in response to the (3m−1)-th column images corresponding to the (3m−1)-th lenticular lenses L(3m−1) are displayed on the display panel 300. For example, the time division driving part 530 can open the third shutter 613 and can close the first shutter 611 and the second shutter 612 in response to the 3m-th column images corresponding to the 3m-th lenticular lenses L3m are displayed on the display panel 300.

Figure 8A:
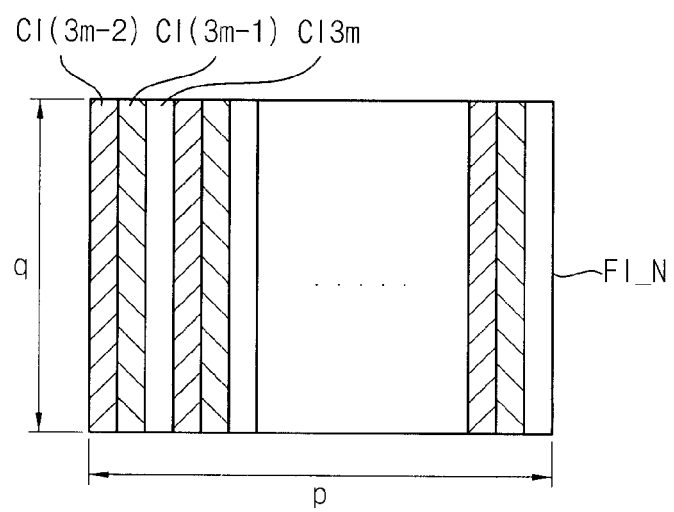
FIG. 8A, FIG. 8B and FIG. 8C are diagrams explaining a method for processing image of a control part of FIG. 6.
Figure 8B:
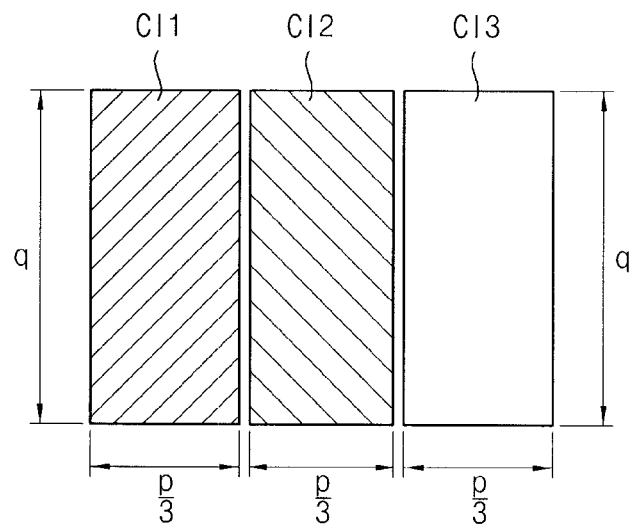
Figure 8C:
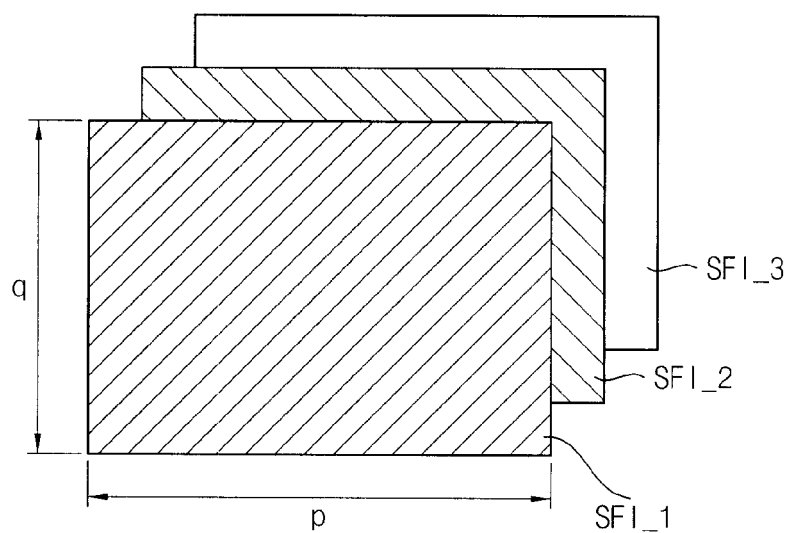

FIG. 8A, FIG. 8B and FIG. 8C are diagrams explaining a method for processing image of a control part of FIG. 6.

Referring to FIG. 6, FIG. 7 and FIG. 8A, the control part 130 may receive an N-th frame image FI_N having a resolution of p×q. The N-th frame image FI_N may include the (3m−2)-th column images CI(3m−2) corresponding to the (3m−2)-th lenticular lenses L(3m−2), the (3m−1)-th column images CI(3m−1) corresponding to the (3m−1)-th lenticular lenses L(3m−1) and the 3m-th column images CI3m corresponding to the 3m-th lenticular lenses L3m. Herein, N is a natural number.

Referring to FIG. 6, FIG. 7 and FIG. 8B, the control part 130 may divide the N-th frame image FI_N into a first column image CI1 including the (3m−2)-th column images CI(3m−2), a second column image CI2 including the (3m−1)-th column images CI(3m−1) and a third column image CI3 including the 3m-th column image CI3m. Each resolution of the first column image CI1, the second column image CI2 and the third column image CI3 is p/3×q.

Referring to FIG. 6, FIG. 7 and FIG. 8C, the control part 130 may scale up the resolutions of the first column image CI1, the second column image CI2 and the third column image CI3 to the resolution of the display panel 300 to generate a first sub-frame image SFI_1, a second sub-frame image SFI_2 and a third sub-frame image SFI_3, respectively.

The control part 130 may provide the display driving part 330 with the first sub-frame image SFI_1, the second sub-frame image SFI_2 and the third sub-frame image SFI_3, and the display driving part 330 may display the first sub-frame image SFI_1 on the display panel 300 during a first sub-frame interval, the second sub-frame image SFI_2 on the display panel 300 during a second sub-frame interval and the third sub-frame image SFI_3 on the display panel 300 during a third sub-frame interval. In this example, if a frame frequency of the N-th frame image FI_N received in the control part 130 is about 60 Hz, each frame frequency of the first sub-frame image SFI_1, the second sub-frame image SFI_2 and the third sub-frame image SFI_3 is about 180 Hz (=60 Hz×3).

Figure 9A:
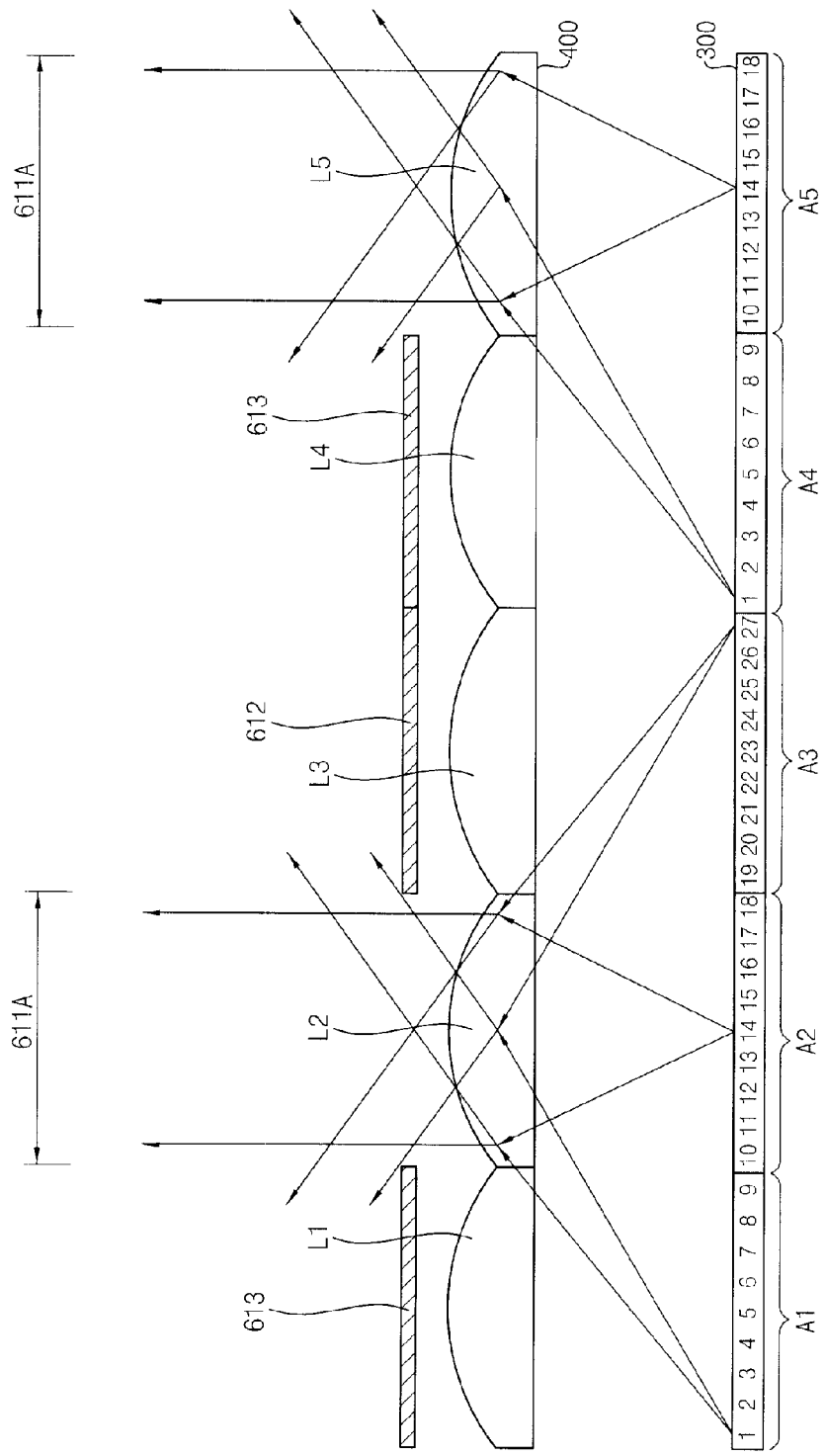
Figure 9B:
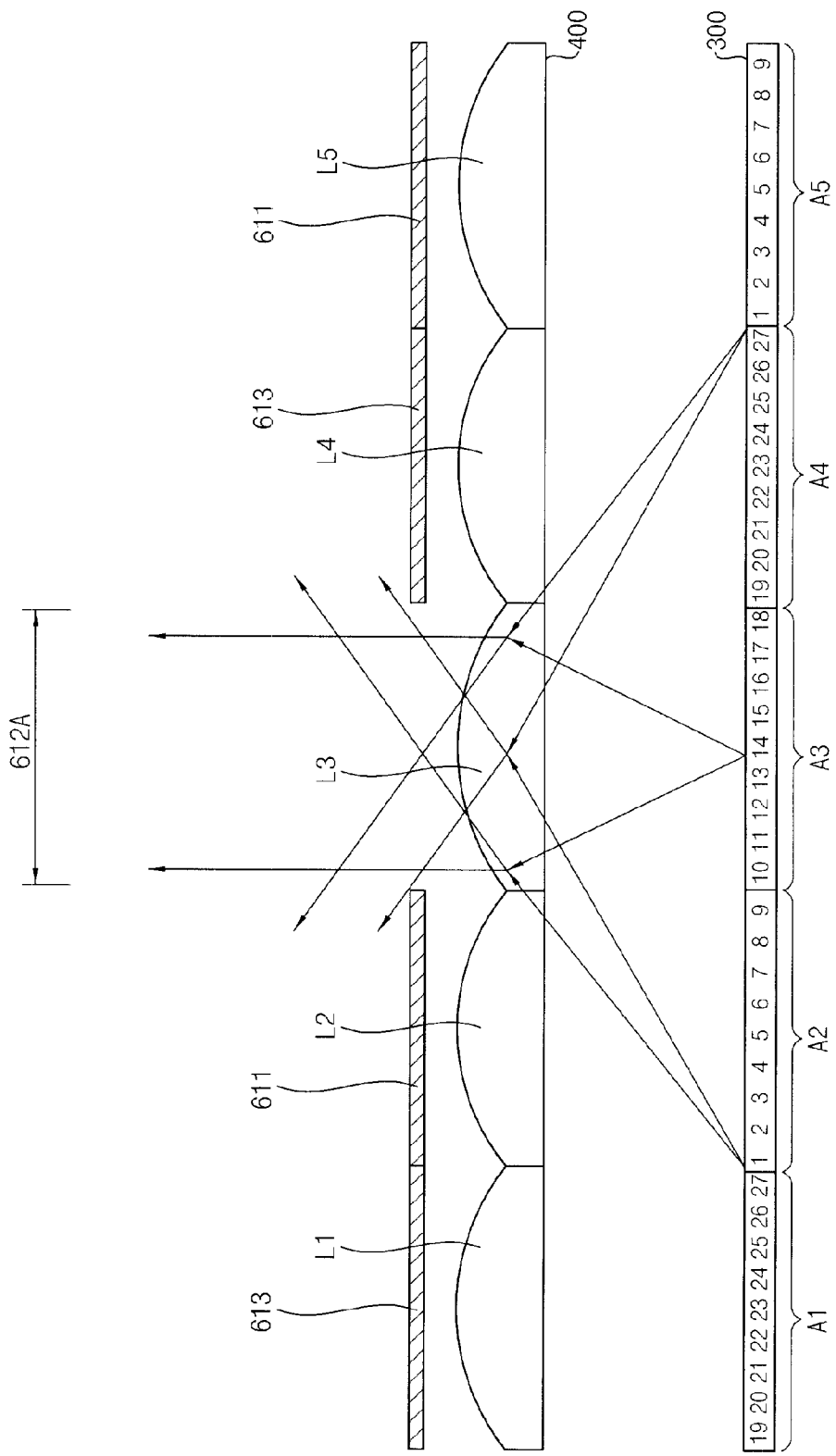
Figure 10:
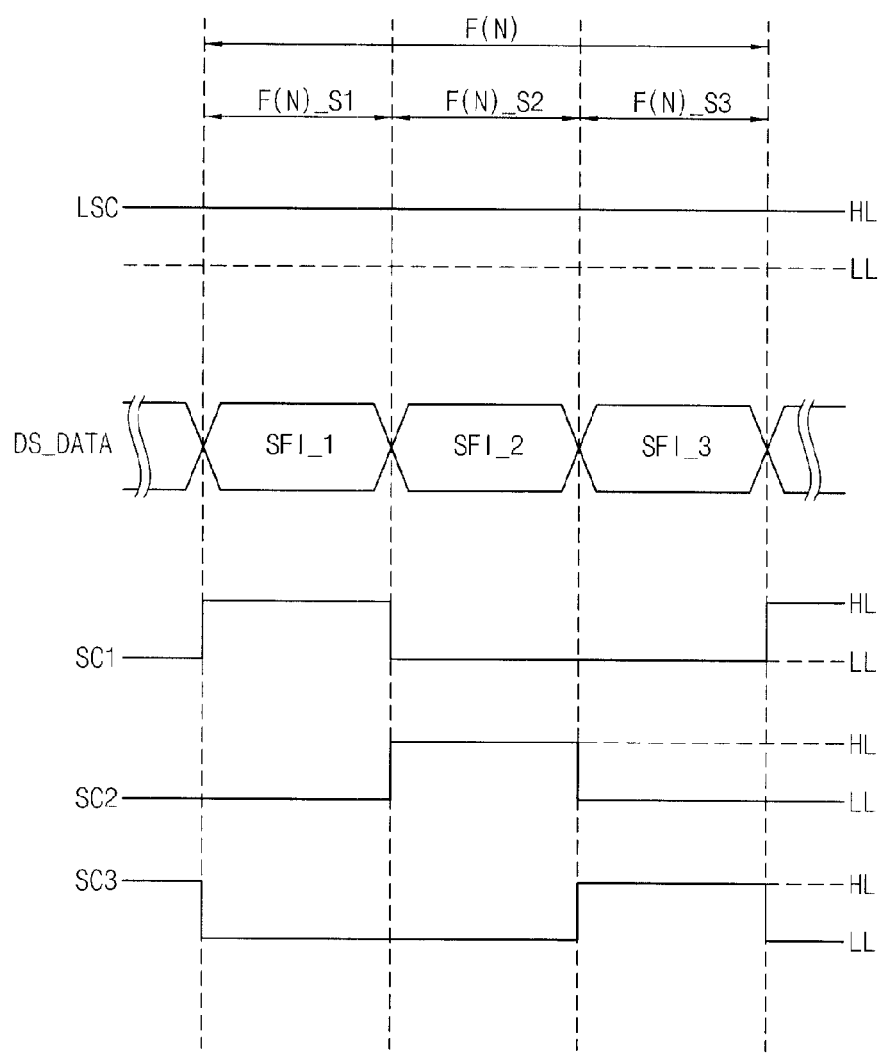
FIG. 10 is a driving timing chart of the stereoscopic image display apparatus FIG. 6.

FIG. 9A, FIG. 9B and FIG. 9C are diagrams explaining a motion of the is stereoscopic image display apparatus of FIG. 6. FIG. 10 is a driving timing chart of the stereoscopic image display apparatus FIG. 6.

Referring to FIG. 6, FIG. 9A and FIG. 10, the light source driving part 230 may provide the light source part 200 with a high level HL light source control signal LSC according to the control of the control part 130. The light source part 200 can be driven to provide the display panel 300 with the light.

The display driving part 330 may display the first sub-frame image SFI_1 corresponding to the (3m−2)-th lenticular lenses L(3m−2) on the display panel 300 during a first sub-frame interval F(N)_S1 of an N-th frame F(N) (DS_DATA) according to the control of the control part 130. Herein, N is a natural number.

The lenticular plate 400 may include a first lenticular lens L1, a second lenticular lens L2, a third lenticular lens L3, a fourth lenticular lens L4 and a fifth lenticular lens L5. The first lenticular lens L1 may be disposed over a first column area A1 including nine color pixels of the display panel 300. The second lenticular lens L2 may be disposed over a second column area A2 adjacent to the first column area A1 of the display panel 300. The third lenticular lens L3 may be disposed over a third column area A3 adjacent to the second column area A2 of the display panel 300. The fourth lenticular lens L4 may be disposed over a fourth column area A4 adjacent to the third column area A3 of the display panel 300. The fifth lenticular lens L5 may be disposed over a fifth column area A5 adjacent to the fourth column area A4.

For example, the second lenticular lens L2 may be disposed over the second column area A2 including nine color pixels 10, 11, 12, 13, 14, 15, 16, 17 and 18 of the display panel 300. The third lenticular lens L3 may be disposed over the third column area A3 including nine color pixels 19, 20, 21, 22, 23, 24, 25, 26 and 27 of the display panel 300, and the fourth lenticular lens L4 may be disposed over the fourth column area A4 including nine color pixels 1, 2, 3, 4, 5, 6, 7, 8 and 9 of the display panel 300.

The time division driving part 630 can open and close the first shutter 611, the second shutter 612 and the third shutter 613 of the barrier plate 600 according to the control of the control part 130. During the first sub-frame interval F(N)_S1 in which the (3m−2)-th column images of the first sub-frame image SFL_1 are displayed on the display panel 300, the time division driving part 530 may provide the barrier plate 500 with a first high level HL shutter control signal SC1 and a second low level LL shutter control signal SC2 and a third low level LL shutter control signal SC3. The first high level HL shutter control signal SC1 can open the first shutter 611 disposed over the (3m−2)-th lenticular lenses L2 and L5. The second low level LL shutter control signal SC2 and the third low level LL shutter control signal SC3 can close the second low level shutter 612 and the third low level LL shutter 613 disposed over the (3m−1)-th and 3m-th lenticular lenses L1, L3 and L4.

The second lenticular lens L2 may convert nine flat images displayed on the second column area A2 of the display panel 300 into nine stereoscopic images, and nine stereoscopic images may be emitted through a first space 611A which is an opening of the first shutter 611. In addition, the second lenticular lens L2 may convert nine flat images displayed on the first column area A1 or the third column area A3 adjacent to the second column area A2 into nine stereoscopic images, and nine flat images are emitted through the first space 611A. Thus, 27 stereoscopic images may be emitted through the first space 611A.

For example, since the third shutter 613 disposed over the first lenticular lens L1 is closed, the second lenticular lens L2 may convert the nine flat images displayed on nine color pixels 1, 2, 3, 4, 5, 6, 7, 8 and 9 included in the first column area A1 corresponding to the first lenticular lens L1 into nine stereoscopic images having directions different from each other, and the nine stereoscopic images are emitted through the first space 611A.

In addition, since the second shutter 612 disposed over the third lenticular lens L3 is closed, the second lenticular lens L2 may convert nine flat images displayed on nine color pixels 19, 20, 21, 22, 23, 24, 25, 26 and 27 included in the third column area A3 corresponding to the third lenticular lens L3 into nine stereoscopic images having directions different from each other, and the nine stereoscopic images may be emitted through the first space 611A.

Since the third shutter 613 disposed over the fourth lenticular lens L4 is closed, the fifth lenticular lens L5 may convert nine flat images displayed on nine color pixels 1, 2, 3, 4, 5, 6, 7, 8 and 9 included in the fourth column area A4 corresponding to the fourth lenticular lens L4 into nine stereoscopic images having directions different from each other, and the nine stereoscopic images may be emitted through the first space 611A over the fifth lenticular lens L5.

A viewer can perceive stereoscopic images having 27 directional characteristics emitted through the first space 611A during the first sub-frame interval F(N)_S1.

Referring to FIG. 6, FIG. 9B and FIG. 10, the light source driving part 230 may provide the light source part 200 with a high level HL light source control signal LSC according to the control of the control part 130. The light source part 200 can be driven to provide the display panel 300 with the light.

The display driving part 330 may display the second sub-frame image SFI_2 corresponding to the (3m−1)-th lenticular lenses L(3m−1) on the display panel 300 during a second sub-frame interval F(N)_S2 of an N-th frame F(N) (DS_DATA) according to the control of the control part 130.

The lenticular plate 400 may include a first lenticular lens L1, a second lenticular lens L2, a third lenticular lens L3, a fourth lenticular lens L4 and a fifth lenticular lens L5. The first lenticular lens L1 may be disposed over a first column area A1 including nine color pixels of the display panel 300. The second lenticular lens L2 may be disposed over a second column area A2 adjacent to the first column area A1 of the display panel 300. The third lenticular lens L3 may be disposed over a third column area A3 adjacent to the second column area A2 of the display panel 300. The fourth lenticular lens L4 may be disposed over a fourth column area A4 adjacent to the third column area A3. The fifth lenticular lens L5 may be disposed over a fifth column area A5 adjacent to the fourth column area A4.

For example, the second lenticular lens L2 may be disposed over the second column area A2 including nine color pixels 1, 2, 3, 4, 5, 6, 7, 8 and 9 of the display panel 300, the third lenticular lens L3 may be disposed over the third column area A3 including nine color pixels 10, 11, 12, 13, 14, 15, 16, 17 and 18 of the display panel 300, and the fourth lenticular lens L4 may be disposed over the fourth column area A4 including nine color pixels 19, 20, 21, 22, 23, 24, 25, 26 and 27 of the display panel 300.

The time division driving part 630 can open and close the first shutter 611, the second shutter 612 and the third shutter 613 of the barrier plate 600 according to the control of the control part 130. During the second sub-frame interval F(N)_S2 in which the (3m−1)-th column images of the second sub-frame image SFI_2 are displayed on the display panel 300, the time division driving part 630 may provide the barrier plate 500 with a second high level HL shutter control signal SC2 and a first low level LL shutter control signal SC1 and a third low level LL shutter control signal SC3. The second high level HL shutter control signal SC2 can open the second shutter 612 disposed over the (3m−1)-th lenticular lenses L3. The first low level LL shutter control signal SC1 and the third low level LL shutter control signal SC3 can close the first shutter 611 and the third shutter 613 disposed over the (3m−2)-th and 3m-th lenticular lenses L1, L2, L4 and L5.

The third lenticular lens L3 may convert nine flat images displayed on the third column area A3 of the display panel 300 into nine stereoscopic images, and the nine stereoscopic images may be emitted through a second space 612A which is an opening of the second shutter 612. In addition, the third lenticular lens L3 may convert nine flat images displayed on the second column area A2 and the fourth column area A4 adjacent to the third column area A3 into nine stereoscopic images, and nine stereoscopic images may be emitted through the second space 612A. Thus, 27 stereoscopic images may be emitted through the second space 612A.

For example, since the first shutter 611 disposed over the second lenticular lens L2 is closed, the third lenticular lens L3 may convert nine flat images displayed on nine color pixels 1, 2, 3, 4, 5, 6, 7, 8 and 9 included in the second column area A2 corresponding to the second lenticular lens L2 into nine stereoscopic images having directions different from each other, and the nine stereoscopic images may be emitted through the second space 612A.

In addition, since the third shutter 613 disposed over the fourth lenticular lens L4 is closed, the third lenticular lens L3 may convert nine flat images displayed on nine color pixels 19, 20, 21, 22, 23, 24, 25, 26 and 27 included in the fourth column area A4 corresponding to the fourth lenticular lens L4 into nine stereoscopic images having directions different from each other, and the nine stereoscopic images may be emitted through the second space 612A.

A (3m−1)-th lenticular lens adjacent to the first lenticular lens L1 may convert nine flat images displayed on nine color pixels 19, 20, 21, 22, 23, 24, 25, 26 and 27 included in the first column area A1 corresponding to the first lenticular lens L1 into nine stereoscopic images, and nine stereoscopic images may be emitted through a second space 612A over the (3m−1)-th lenticular lens adjacent to the first lenticular lens L1. By way of example, a (3m−1)-th lenticular lens adjacent to the fifth lenticular lens L5 may convert nine flat images displayed on nine color pixels 1, 2, 3, 4, 5, 6, 7, 8 and 9 included in the fifth column area A5 corresponding to the fifth lenticular lens L5 into nine stereoscopic images, and the nine stereoscopic images may be emitted through a second space 612A over the (3m−1)-th lenticular lens adjacent to the fifth lenticular lens L5.

A viewer can perceive stereoscopic images having 27 directional characteristics and emitted through the first space 612A during the second sub-frame interval F(N)_S2.

Referring to FIG. 6, FIG. 9C and FIG. 10, the light source driving part 230 may provide the light source part 200 with a high level HL light source control signal LSC according to the control of the control part 130. The light source part 200 can be driven to provide the display panel 300 with the light.

The display driving part 330 may display the third sub-frame image SFI_3 corresponding to the 3m-th lenticular lenses L3m on the display panel 300 during a third sub-frame interval F(N)_S3 of an N-th frame F(N) (DS_DATA) according to the control of the control part 130.

The lenticular plate 400 may include a first lenticular lens L1, a second lenticular lens L2, a third lenticular lens L3, a fourth lenticular lens L4 and a fifth lenticular lens L5. The first lenticular lens L1 may be disposed over a first column area A1 including nine color pixels of the display panel 300. The second lenticular lens L2 may be disposed over a second column area A2 adjacent to the first column area A1 of the display panel 300. The third lenticular lens L3 may be disposed over a third column area A3 adjacent to the second column area A2 of the display panel 300. The fourth lenticular lens L4 may be disposed over a fourth column area A4 adjacent to the third column area A3. The fifth lenticular lens L5 may be disposed over a fifth column area A5 adjacent to the fourth column area A4.

For example, the second lenticular lens L2 may be disposed over the second column area A2 including nine color pixels 19, 20, 21, 22, 23, 24, 25, 26 and 27 of the display panel 300, the third lenticular lens L3 may be disposed over the third column area A3 including nine color pixels 1, 2, 3, 4, 5, 6, 7, 8 and 9 of the display panel 300, and the fourth lenticular lens L4 may be disposed over the fourth column area A4 including nine color pixels 10, 11, 12, 13, 14, 15, 16, 17 and 18 of the display panel 300.

The time division driving part 630 can open and close the first shutter 611, the second shutter 612 and the third shutter 613 of the barrier plate 600 according to the control of the control part 130. During the third sub-frame interval F(N)_S3 in which the 3m-th column images of the third sub-frame image SFI_3 are displayed on the display panel 300, the time division driving part 630 may provide the barrier plate 600 with a third high level HL shutter control signal SC3 and a first low level LL shutter control signal SC1 and a second low level LL shutter control signal SC2. The third high level HL shutter control signal SC3 can open the third shutter 613 disposed over the 3m-th lenticular lenses L1 and L4. The first low level LL shutter control signal SC1 and the second low level LL shutter control signal SC2 can close the first and second shutters 611 and 612 disposed over the (3m−2)-th and (3m−1)-th lenticular lenses L2 and L3 and L5.

The fourth lenticular lens L4 may convert nine flat images displayed on the fourth column area A4 of the display panel 300 into nine stereoscopic images, and the nine stereoscopic images may be emitted through a third space 613A which is an opening of the third shutter 613. In addition, the fourth lenticular lens L4 may convert nine flat images displayed on the third column area A3 and the fifth column area A5 adjacent to the fourth column area A4 into nine stereoscopic images, and the nine stereoscopic images may be emitted through the third space 613A. Thus, 27 stereoscopic images may be emitted through the third space 613A.

For example, since the second shutter 612 disposed over the third lenticular lens L3 is closed, the fourth lenticular lens L4 may convert nine flat images displayed on nine color pixels 1, 2, 3, 4, 5, 6, 7, 8 and 9 included in the third column area A3 corresponding to the third lenticular lens L3 into nine stereoscopic images having directions different from each other, and the nine stereoscopic images may be emitted through the third space 613A.

In addition, since the first shutter 611 disposed over the fifth lenticular lens L5 is closed, the fourth lenticular lens L4 may convert nine flat images displayed on nine color pixels 19, 20, 21, 22, 23, 24, 25, 26 and 27 included in the fifth column area A5 corresponding to the fifth lenticular lens L5 into nine stereoscopic images having directions different from each other, and the nine stereoscopic images may be emitted through the second space 613A.

The first lenticular lens L1 may convert nine flat images displayed on nine color pixels 10, 11, 12, 13, 14, 15, 16, 17 and 18 included in the first column area A1 corresponding to the first lenticular lens L1 into nine stereoscopic images, and the nine stereoscopic images may be emitted through the third space 613A over the first lenticular lens L1. Since the first shutter 611 disposed over the second lenticular lens L2 is closed, the first lenticular lens L1 may convert nine flat images displayed on nine color pixels 19, 20, 21, 22, 23, 24, 25, 26 and 27 included in the second column area A2 corresponding to the second lenticular lens L2 into nine stereoscopic images, and the nine stereoscopic images may be emitted through the third space 613A over the first lenticular lens L1.

Thus, a viewer can perceive stereoscopic images having 27 directional characteristics and emitted through the third space 613A during the third sub-frame interval F(N)_S3.

In this way, the viewer can perceive an N-th frame image FI_N as 27 stereoscopic images during one frame (e.g. 60 Hz). Herein, N is a natural number.

In some examples, K flat images may be converted into stereoscopic images having K directional characteristics using the lenticular lenses and the K images may be extended to (K×M) stereoscopic images using M shutters driving in the time division type on a lenticular plate including a plurality of lenticular lenses so that the viewing angle of a stereoscopic image may be increased. Thus, display quality of a stereoscopic image may be enhanced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for displaying a stereoscopic image of a display apparatus, the display apparatus comprising a lenticular plate comprising a plurality of lenticular lenses disposed over a display panel to divide the display panel into a plurality of column areas, and to convert a flat image displayed on each of the column areas into K stereoscopic images having directions different from each other, the method comprising:
   dividing column images corresponding to the column areas to generate M sub-frame images;
   displaying the M sub-frame images on the display panel in a time division method; and
   selectively opening and closing M shutters disposed over M lenticular lenses according to the M sub-frame images, displayed on the display panel, wherein the K stereoscopic images are extended to K×M stereoscopic images, and
   wherein K and M are natural numbers.

2. The method of claim 1, wherein generating the M sub-frame images comprises:
   generating a first sub-frame image comprising odd-numbered column images corresponding to odd-numbered column areas and generating a second sub-frame image comprising even-numbered column images corresponding to even-numbered column areas.

3. The method of claim 2, wherein selectively opening and closing the M shutters comprises:
   opening a first shutter disposed over odd-numbered lenticular lenses and closing a second shutter disposed over even-numbered lenticular lenses in response to the first sub-frame image being displayed on the display panel; and
   opening the second shutter and closing the first shutter in response to the second sub-frame image being displayed on the display panel.

4. The method of claim 1, wherein the M sub-frame images comprises a first sub-frame image comprising (3m−2)-th column images corresponding to (3m−2)-th column areas, a second sub-frame image comprising (3m−1)-th column images corresponding to (3m−1)-th column areas and a third sub-frame image comprising 3m-th column images corresponding to 3m-th column areas.

5. The method of claim 4, wherein selectively opening and closing the M shutters comprises:
   opening a first shutter disposed over (3m−2)-th lenticular lenses and closing a second shutter disposed over (3m−1-th lenticular lenses and a third shutter disposed over 3m-th lenticular lenses in response to the first sub-frame image being displayed on the display panel;
   opening the second shutter and closing the first shutter and the third shutter in response to the second sub-frame image being displayed on the display panel; and
   opening the third shutter and closing the first shutter and the second shutter in response to the third sub-frame image being displayed on the display panel.

6. A display, comprising:
   a display panel comprising a plurality of color pixels;
   a lenticular plate comprising a plurality of lenticular lenses to divide the display panel into a plurality of column areas, each of the lenticular lenses to convert a flat image displayed on each of the column areas into K stereoscopic images having directions different from each other;
   a control part to separate column images corresponding to the column areas to generate M sub-frame images and to display the M sub-frame images on the display panel in a time division method; and
   a barrier plate comprising M shutters disposed over M lenticular lenses, the M shutters being selectively opened and closed to the M sub-frame images on the display panel, wherein the K stereoscopic images are extended to K×M stereoscopic images, and
   wherein K and M are natural numbers.

7. The display of claim 6, wherein each of the color pixels comprises a short side and a long side, and the lenticular lenses are arranged substantially parallel with the short sides of the color pixels and extended substantially parallel with the long sides of the color pixels.

8. The display of claim 7, wherein each of the lenticular lenses is arranged over K color pixels arranged substantially parallel with the short side of the color pixel.

9. The display of claim 7, wherein the color pixels adjacent to each other along the long side of the color pixel comprise colors different from each other.

10. The display of claim 6, further comprising:
    a time division driving part to control opening and closing of the M shutters of the barrier plate,
    wherein the control part controls the time division driving part according to an image displayed on the display panel.

11. The display of claim 10, wherein the control part generates a first sub-frame image comprising odd-numbered column images corresponding to odd-numbered column areas and a second sub-frame image comprising even-numbered column images corresponding to even-numbered column areas.

12. The display of claim 11, wherein the time division driving part opens a first shutter disposed over odd-numbered lenticular lenses and closes a second shutter disposed over even-numbered lenticular lenses in response to the first sub-frame image being displayed on the display panel, and opens the second shutter and closes the first shutter in response to the second sub-frame image being displayed on the display panel.

13. The display of claim 12, wherein each of the first sub-frame image and the second sub-frame image has a second frame frequency twice as high as a first frame frequency, the first frame frequency being the frequency of a frame image comprising the first sub-frame image and the second sub-frame image.

14. The display of claim 10, wherein the control part generates a first sub-frame image comprising $(3m-2)$-th column images corresponding to $(3m-2)$-th column areas, a second sub-frame image comprising $(3m-1)$-th column images corresponding to $(3m-1)$-th column areas and a third sub-frame image comprising $3m$-th column images corresponding to $3m$-th column areas.

15. The display of claim 14, wherein the time division driving part
opens a first shutter disposed over $(3m-2)$-th lenticular lenses and closes a second shutter disposed over $(3m-1)$-th lenticular lenses and a third shutter disposed over $3m$-th lenticular lenses in response to the first sub-frame image being displayed on the display panel,
opens the second shutter and closes the first shutter and the third shutter in response to the second sub-frame image being displayed on the display panel, and
opens the third shutter and closes the first shutter and the second shutter in response to the third sub-frame image being displayed on the display panel.

16. The display apparatus of claim 15, wherein each of the first sub-frame image, the second sub-frame image, and the third sub-frame image has a second frame frequency three times as high as a first frame frequency, the first frame frequency being the frequency of a frame image comprising the first sub-frame image, the second sub-frame image, and the third sub-frame image.

17. An apparatus, comprising:
a plurality of vertical and horizontal display pixels disposed on a panel and a sheet of cylindrical lenses disposed on the display pixels to provide stereoscopic images by converting a flat image into K stereoscopic images, each direction of the stereoscopic images different from each other, wherein images of the vertical display pixel areas corresponding to the cylindrical lenses are divided to generate M sub-frame images; and
a plate comprising a plurality of shutters disposed over the cylindrical lenses, wherein the shutters selectively open and close in response to displaying of the M sub-frame images, wherein the K stereoscopic images are extended to K×M stereoscopic images.

18. The apparatus of claim 17, wherein each of the display pixels has a short side and a long side, and the cylindrical lenses are arranged substantially parallel with the short sides of the display pixels and extended substantially parallel with the long sides of the display pixels.

19. The apparatus of claim 17, wherein the sub-frame images comprise a first sub-frame image and a second sub-frame image and each of the first sub-frame image and the second sub-frame image has a second frame frequency twice as high as a first frame frequency, the first frame frequency being the frequency of a frame image comprising the first sub-frame image and the second sub-frame image.

20. The apparatus of claim 19, further comprising:
a controller generates a first sub-frame image comprising $(3m-2)$-th column images corresponding to $(3m-2)$-th column areas, a second sub-frame image comprising $(3m-1)$-th column images corresponding to $(3m-1)$-th column areas and a third sub-frame image comprising $3m$-th column images corresponding to $3m$-th column areas,
wherein each of the first sub-frame image, the second sub-frame image, and the third sub-frame image has a second frame frequency three times as high as a first frame frequency, the first frame frequency being the frequency of a frame image comprising the first sub-frame image, the second sub-frame image, and the third sub-frame image.

* * * * *